(12) United States Patent
Sunanda

(10) Patent No.: US 8,706,899 B2
(45) Date of Patent: Apr. 22, 2014

(54) TRANSMITTING PETROLEUM WELL DATA FROM A MOBILE DRILLING RIG

(71) Applicant: Halliburton Energy Services, Inc., Houston, TX (US)

(72) Inventor: Kiran Gopala Reddy Sunanda, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/852,121

(22) Filed: Mar. 28, 2013

(65) Prior Publication Data

US 2013/0282862 A1 Oct. 24, 2013

(51) Int. Cl.
*G06F 15/16* (2006.01)

(52) U.S. Cl.
USPC .......................................................... 709/232

(58) Field of Classification Search
USPC .......................................................... 709/232
See application file for complete search history.

(56) References Cited

U.S. PATENT DOCUMENTS

| | | | |
|---|---|---|---|
| 5,610,818 A | 3/1997 | Ackroyd et al. | |
| 6,343,313 B1 | 1/2002 | Salesky et al. | |
| 6,985,750 B1* | 1/2006 | Vicknair et al. | 455/519 |
| 7,593,987 B2 | 9/2009 | Salesky et al. | |
| 7,822,859 B2 | 10/2010 | Salesky et al. | |
| 7,832,500 B2 | 11/2010 | Garcia et al. | |
| 2005/0161260 A1* | 7/2005 | Koithan et al. | 175/57 |
| 2007/0055780 A1 | 3/2007 | Cartes et al. | |
| 2010/0114493 A1 | 5/2010 | Vestal | |
| 2010/0147510 A1 | 6/2010 | Kwok et al. | |
| 2010/0147589 A1 | 6/2010 | Wingky | |

FOREIGN PATENT DOCUMENTS

WO WO 2008/032194 3/2008

OTHER PUBLICATIONS

Authorized officer Oliver Huber, Extended European Search Report in European Application No. 13160364.9-1856, mailed May 6, 2013, 4 pages.
Authorized officer Alena Kastlova, International Search Report and Written Opinion in International Application No. PCT/US2012/034789, mailed Jan. 3, 2013, 18 pages.

* cited by examiner

*Primary Examiner* — Larry Donaghue
*Assistant Examiner* — Marshall McLeod
(74) *Attorney, Agent, or Firm* — Fish & Richardson P.C.; Russell N. Rippamonti; Bradley A. Misley

(57) ABSTRACT

Computer-implemented methods, computer-readable media, and computer systems for transmitting petroleum well data from a mobile drilling rig. A rig computer system at the mobile drilling rig receives a request for petroleum well data from a first real-time operations center (ROC) computer system at a ROC over a network. The rig computer system has previously transmitted the requested data to second ROC computer system over the network. The rig computer system determines that the first and second ROC computer systems are connected by a network of greater bandwidth than the network that connects the rig computer system and the first ROC computer system. The rig computer system responds to the first ROC computer system by re-directing the first ROC computer system to the second ROC computer system rather than by transmitting the petroleum well data to the first ROC computer system.

19 Claims, 4 Drawing Sheets

TRANSMITTING PETROLEUM WELL DATA FROM A MOBILE DRILLING RIG

TECHNICAL FIELD

The present disclosure relates to petroleum well data gathered on mobile drilling rigs.

BACKGROUND

Mobile drilling rigs include structures with facilities to drill wells, and to extract and process product (for example, oil and natural gas) from the wells. Often, the drilling rigs are installed off-shore, for example, in a region that is in a body of water and away from the shore. Data obtained from the well can be used to determine whether to complete the well, for example, by installing casings, passing production strings, and the like, after drilling. Well data can be used to properly design production facilities for the well and whether to drill additional wells. Additionally, the information describing a well from which product is being extracted can be used to obtain feedback about the well based on which decisions about operations on the well—such as continued production, temporary shut-off, and the like—can be made.

SUMMARY

The present disclosure describes computer-implemented methods, computer-readable media, and systems for transmitting petroleum well data from a mobile drilling rig.

In general, one innovative aspect of the subject matter described here can be implemented as a computer-implemented method performed by data processing apparatus for transmitting data associated with a petroleum well from a mobile drilling rig to operations centers. A first data request is received at a first computer system located on a mobile drilling rig from a second computer system located at a first operations center. The first operations center is located remote from the mobile drilling rig. The first data request is transmitted over a first communications network that connects the first computer system and the second computer system. The first data request seeks data associated with a petroleum well that is being drilled or has been drilled by the mobile drilling rig. In response to receiving the first data request, data that satisfies the first data request is retrieved by the first computer system from a computer-readable storage medium connected to the first computer system. The data is transmitted from the first computer system to the second computer system over the first communications network. It is determined by the first computer system that a bandwidth of a third discrete communications network that connects the second computer system located at the first operations center and the third computer system located at the second operations center is greater than a bandwidth of the second communications network. In response to receiving the second data request, an identity of the second computer system located at the first operations center is transmitted to the third computer system located at the second operations center. A notification is transmitted to the third computer system to request at least the portion of the data satisfying the second data request from the second computer system.

This, and other aspects, can include one or more of the following features. The second computer located at the first operations center can be assigned as a master computer system by the first computer system located on the mobile drilling rig. Computer systems located at operations centers that subsequently request the data can be assigned as slave computer systems. Each of the slave center computer systems can be instructed to request the data associated with the oil well from the first computer system by the first computer system located on the mobile drilling rig. The second communications network can be a satellite network. The bandwidth of the third communications network is at least two or more times greater than the bandwidth of the satellite network. The bandwidth of the second communications network is substantially 32 kilobits per second. The bandwidth of the third communications network is in the order of megabits per second. Transmitting the identity of the second computer system located at the second operations center can include generating a response to the second data request, and including a communications network address of the second computer system located at the first operations center and the notification in the response. The data associated with the petroleum well can be received by the first computer system by multiple measuring devices adapted to measure the well data and to transmit the well data to the first computer system. The well data can be obtained by logging tools disposed in the petroleum well. The mobile rig can be located in a body of water at least 50 miles remote from the first and second operations center.

Another innovative aspect of the subject matter described here can be implemented as a non-transitory computer-readable medium storing computer software instructions executable by data processing apparatus to perform operations for transmitting data associated with a petroleum well from a mobile drilling rig to operations centers. The operations include receiving, at a first computer system located on a mobile drilling rig, a data request from a second computer system located at a first operations center. The first operations center is located remote from the mobile drilling rig. The data request is transmitted over a satellite network that connects the first computer system and the second computer system. The data request seeks data associated with a petroleum well that is being drilled or has been drilled by the mobile drilling rig. The data associated with the petroleum well has previously been transmitted to a third computer system located at a second operations center over the satellite network. The operations include determining, at the first computer system, that a bandwidth of a communications network that connects the second computer system and the third computer system is greater than a bandwidth of the satellite network. The operations include in response to receiving the data request, providing, by the first computer system, to the second computer system: an identity of the third computer system, and instructions to request the data associated with the petroleum well from the third computer system.

This, and other aspects can include one or more of the following features. The operations can further include receiving, by the first computer system, a previous data request for the data associated with the petroleum well from the third computer system. The previous data request can be received before the data request from the second computer system. The operations can include, in response to receiving the previous request, transmitting, by the first computer system, the data associated with the petroleum well to the third computer system over the satellite network. The first computer system can be located off-shore, and the second computer system and the third computer system can be located on-shore. The network that connects the second computer system and the third computer system can be a wired or a wireless network. The bandwidth of the wired or the wireless network can be an order of magnitude greater than the bandwidth of the satellite network. The operations can further include receiving, by the first computer system, a new request for new data associated with the petroleum well that is different from the data associated with the petroleum well from a fourth computer system located at a third operations center. The operations can further include, in response to receiving the new request for the new data, transmitting, by the first computer system, the new data to the fourth computer system over the satellite network. The operations can further include receiving, by the first computer system, another request for the new data from the second computer system and, in response to receiving the other request, providing, by the first computer system, to the second computer system: an identity of the fourth computer system, and instructions to request the new data associated with the petroleum well from the fourth computer system. The operations can further include receiving, by the first computer system, a new request for the data associated with the petroleum well that has previously been transmitted to the third computer system and for additional data associated with the petroleum well that was received by the first computer system after the data associated with the petroleum well was transmitted to the third computer system. The new request can be received from a fourth computer system located at a third operations center over the satellite network. The operations can further include, in response to receiving the new request, transmitting, by the first computer system, the additional data to the fourth computer system over the satellite network, and providing, by the first computer system, to the fourth computer system: the identity of the third computer system, and the instructions to request the data associated with the petroleum well from the third computer system.

A further innovative aspect of the subject matter described here can be implemented as a system that includes one or more data processing apparatus, and a computer-readable medium storing computer software instructions executable by the data processing apparatus to perform operations for transmitting data associated with a petroleum well from a mobile drilling rig to operations centers. The operations include receiving, at a first computer system located on a mobile oil rig, a request for data associated with a petroleum well from a second computer system located at a first operations center over a first communications network that connects the first computer system and the second computer system; in response to receiving the request, transmitting, at the first computer system, the data associated with the petroleum well to the second computer system over the first network; identifying, at the first computer system, one or more third computer systems located at one or more corresponding second operations centers, wherein each third computer system is connected to the second computer system through a communications network that has a greater bandwidth than the first communications network; and providing, at the first computer system, a notification to each of the one or more third computer systems to transmit a request for the data associated with the oil well to the second computer system.

This, and other aspects, can include one or more of the following features. A bandwidth of the communications network that connects a third computer system to the first computer system can be at least two or more times greater than a bandwidth of the first communications network. A bandwidth of the communications network that connects a third computer system to the first computer system can be at least an order of magnitude greater than a bandwidth of the first communications network. The bandwidth of the first communications network can be 64 kilobits per second and the bandwidth of the communications network that connects the third computer system to the first computer system can be 256 kilobits per second. A bandwidth of the communications network that connects a third computer system to the first computer system can be in the order of megabits per second.

A bandwidth of the first communications network can be in the order of kilobits per second. The bandwidth of the first communications network can be 64 kilobits per second.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
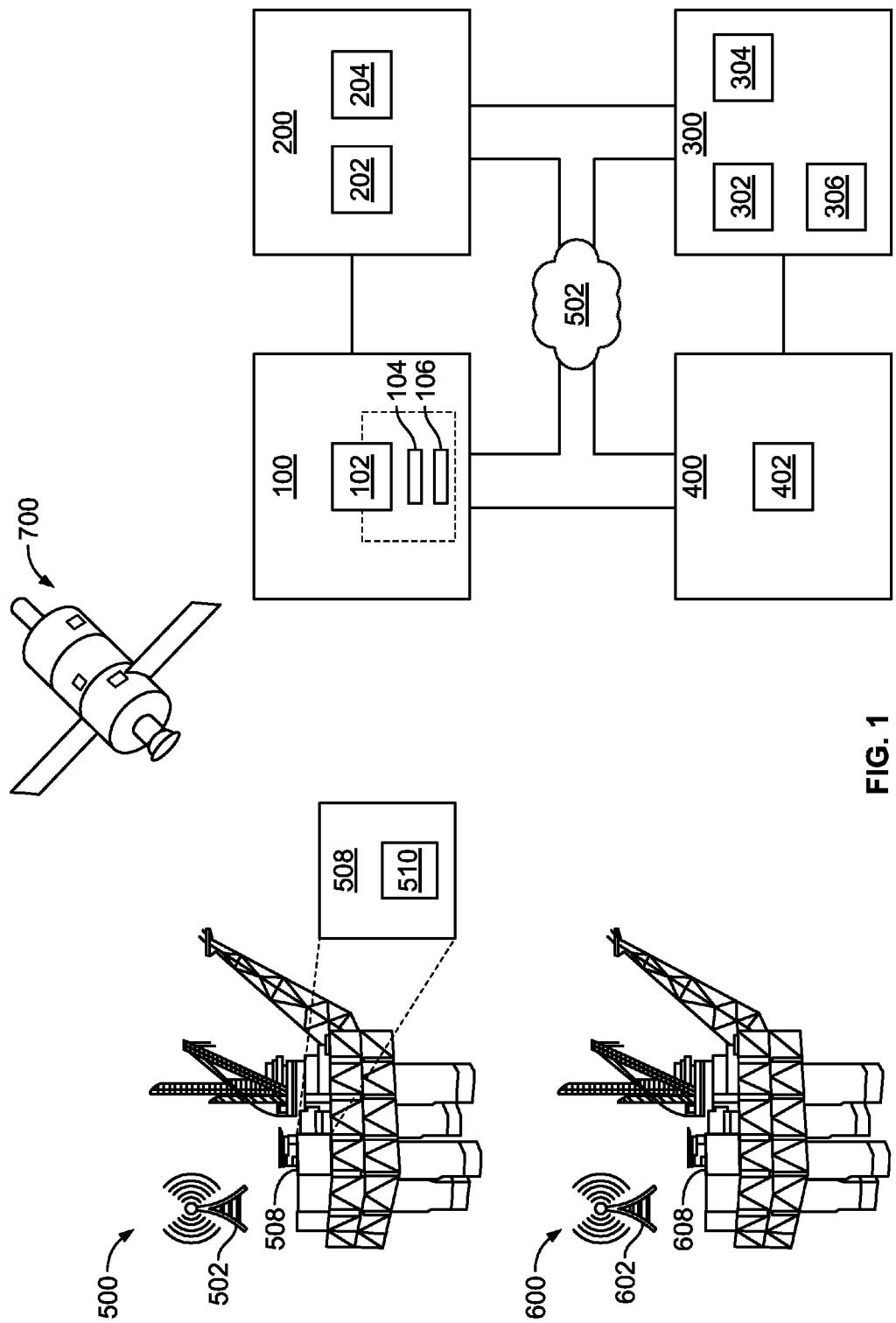
FIG. 1 illustrates an environment in which petroleum well data is transmitted from mobile drilling rigs to real-time operation centers.

This disclosure describes computer-implemented methods, computer-readable media, and computer systems for transmitting petroleum well data from a mobile drilling rig, for example, to a real-time operations center (ROC). One or more computer systems can be located at a mobile drilling rig, for example, an off-shore mobile drilling rig or other mobile drilling rig located at a remote location. The computer system located at the mobile drilling rig (rig computer system) can execute operations to obtain data describing a petroleum well including, for example, data describing a geologic and other properties of a subsurface geologic formation into which the petroleum well can be drilled, the petroleum well itself, and the like. In some implementations, the rig computer system can be connected to one or more measuring instruments over wired or wireless networks or both installed on the mobile drilling rig. For example, the measuring instruments can be logging tools disposed temporarily or permanently in different parts of the petroleum well to measure data, for example, geologic parameters, pressure, temperature, and the like, and to transmit the measured data to the computer systems, which can receive and store the data. The computer systems can continuously receive data at a rate of several kilobytes per second and can be received for several days or longer. Multiple rig computer systems can be located at multiple drilling rigs; one or more rig computer systems can be located at each drilling rig. Each rig computer system can communicate with one or more computer systems located at an on-shore ROC (a ROC computer system), which can serve as a hub that communicates with one or more of the multiple drilling rigs.

The remote location at which a mobile drilling rig is located can be inaccessible to high bandwidth data transmission networks, for example, high bit-rate Ethernet networks, the Internet, and the like. For example, the mobile drilling rig can be located 50 miles or more off-shore in a large body of water such as an ocean, a gulf, and the like. Alternatively, or in addition, the drilling rig can be located in environmentally challenging conditions in which installing an infrastructure for high bit-rate networks is difficult. On the other hand, the location at which a ROC is located can be easily accessible to high bandwidth, wired or wireless networks such as Ethernet networks, the Internet, and the like. For example, the ROC can be located in a commercial building in which data transmission network infrastructure is installed. A rig computer system located at the drilling rig and a ROC computer system located at the ROC can be connected through and can exchange data over a data transmission network, for example, a wireless network, such as, a satellite network, a cellular telephone network, and the like. It may not be possible to connect the rig computer system and the ROC computer system by a wired network due to a distance between the physical locations of the mobile drilling rig and the ROC, respectively, the environmentally-challenging conditions in which the drilling rigs are installed and operated, combinations of them, and the like.

One or more of multiple rig computer systems can communicate with one or more of multiple ROC computer systems over the data transmission network. In some implementations, a ROC computer system can provide a request over the data transmission network for a portion of or all of the petroleum well data collected and stored by a rig computer system. In response, the rig computer system can transmit the requested portions of the petroleum well data to the ROC computer system. The volume of petroleum well data transmitted and a bandwidth of the data transmission network can affect a rate at which the rig computer system transmits the petroleum well data to one or more ROC computer systems. The bandwidth, in turn, can be affected by several factors including a distance between physical locations of the drilling rigs and the ROCs, the network infrastructure at the drilling rig, the challenging environmental conditions in which drilling rigs are installed and operated, and the like.

In some implementations, a rig computer system can receive requests for petroleum well data from multiple ROC computer systems, which can all be located at the same ROC or can be distributed across multiple ROCs. For example, the rig computer system can receive a request for petroleum well data from a first ROC computer system over the network, and, in response, can transmit the petroleum well data to the first ROC computer system over the network. Subsequently, the rig computer system can receive another request for petroleum well data from a second ROC computer system that is different from the first ROC computer system over the network. The rig computer system can determine that all or portions of the petroleum well data requested by the second ROC computer system have previously been transmitted to the first ROC computer system. Rather than transmitting the petroleum well data to the second ROC computer system over the network again, the rig computer system can re-direct the second ROC computer system to the first ROC computer system, and can instruct the second ROC computer system to request and obtain the petroleum well data from the first ROC computer system. The second ROC computer system can then communicate with the first ROC computer system over another network, for example, a wired or wireless Ethernet network, that has a greater bandwidth than the network that connects each ROC computer system to the rig computer system. By doing so, the second ROC computer system can receive the petroleum well data from the first ROC computer system.

Implementations of the techniques described here can offer one or more of several potential advantages. By directing ROC computer systems to transmit and receive petroleum well data between each other, the rig computer system can decrease a transmission load on the network that connects the rig computer system to the ROC computer system. The transmission of petroleum well data from the mobile drilling rigs to the ROCs can be efficiently distributed, for example, when the bandwidth of the network over which the petroleum well data is transmitted is low. By directing one ROC computer system to request and obtain data from another ROC computer system, an amount of data transmitted over the relatively slower network that connects the rig computer system and the ROC computer system can be decreased. Instead, the relatively faster network that connects two ROC computer systems can be used more efficiently. Also, because the first and second ROC computer systems can request the same petroleum well data, re-directing the second ROC computer system to obtain the data from the first ROC computer system can decrease, minimize, or eliminate the transfer of redundant information over the relatively slower network. The bandwidth that is thus saved can be used to transmit new petroleum well data or other data from the rig computer system to the ROC computer system. Because the ROC computer system receives petroleum well data from another ROC computer system, a latency in receipt of messages is decreased. The ROC computer system can receive the petroleum well data sooner, allowing users faster access to the data, and an ability to make real-time decisions more quickly. Moreover, because the network that connects two ROC computer systems can be more robust than the network that connects a rig computer system and a ROC computer system, a reliability of the data transfer model described here can be high.

FIG. 1 illustrates an environment in which petroleum well data is transmitted from mobile drilling rigs to real-time operation centers. The example environment illustrated in FIG. 1 includes four ROCs—a first ROC 100, a second ROC 200, a third ROC 300, and a fourth ROC 400. One or more ROC computer systems can be located at each ROC. For example, the first ROC 100 can include a first ROC computer system 102, which, in turn, can include data processing apparatus 104 and a computer-readable medium 106 storing computer program instructions executable by the data processing apparatus 104 to perform operations including those described here. Alternatively, or in addition, the first ROC 100 can include hardware (not shown), firmware (not shown), or combinations of them (with each other or with computer software or both) that are configured to perform the operations described here.

One or more ROC computer systems can be located at each ROC. For example, two ROC computer systems—the second ROC computer system 202 and the third ROC computer system 204—can be located at the second ROC 200. Three ROC computer systems—the fourth ROC computer system 302, the fifth ROC computer system 304, and the sixth ROC computer system 304—can be located at the third ROC 300. A seventh ROC computer system 402 can be located at the fourth ROC 400. Similarly to the first ROC computer system 102, each of the ROC computer systems in each of the ROCs can be implemented as computer software instructions stored on computer-readable media and executed by data processing apparatus, as hardware, as firmware, or as combinations of two or more of them.

The multiple ROC computer systems located at the multiple ROCs can be connected to each other by wired or wireless networks 502, for example, an Ethernet network, the Internet, and the like. Similarly, the ROC computer systems located at the same ROC can also be connected to each other by wired or wireless networks. A bandwidth of the network 502 that connects the ROC computer systems to each other can be greater than a bandwidth of the network that connects the ROC computer systems to rig computer systems. For example, the bandwidth of the network that connects the ROC computer systems to each other can be at least two or more times greater, or at least an order of magnitude greater than the bandwidth of the network that connects the ROC computer systems to the rig computer systems.

The example environment shown in FIG. 1 further includes two mobile drilling rigs, namely, a first mobile drilling rig 500 and a second mobile drilling rig 600 at respective remote locations. In some implementations, the example environment can include more or fewer than two drilling rigs at respective remote locations.

Each of the first and the second mobile drilling rigs can be connected to one or more of the ROCs through a network 700, for example, a satellite network. As described below, a bandwidth of the network 700 can be less than that of the network 502 such that a rate at which data—for example, petroleum well data—can be transmitted over the network 700 is less relative to a rate at which the data can be transmitted over the network 502. In some implementations, a first transceiver 502 and a second transceiver 602 can be located at the first drilling rig 500 and the second drilling rig 600, respectively, to receive requests for data including petroleum well data, and to transmit petroleum well data in response to receiving the data requests over the network 700. To do so, one or more rig computer systems can be located at each drilling rig and can be connected to each transceiver. For example, a first rig computer system 508 and a second rig computer system 608 can be located at the first drilling rig 500 and the second drilling rig 600, respectively.

In some implementations, the first rig computer system 508 can implement methods for transmitting data associated with the petroleum well from the first drilling rig 500 to one or more ROC computer systems located at the one or more ROCs. The first rig computer system 508 can receive a first data request from the first ROC computer system 102 located at the first ROC 100. As described previously, the first ROC 100 is located remote from the first drilling rig 500. The first data request can be transmitted, for example, by the first ROC computer system 102, over the network 700 that connects the first rig computer system 508 and the first ROC computer system 102. The first data request can seek data associated with the petroleum well that is being drilled or has been drilled by the first drilling rig 500.

In response to receiving the first data request, the first rig computer system 508 can retrieve data that satisfies the first data request, for example, from a computer-readable storage medium 510 connected to the first rig computer system 508. The first rig computer system 508 can transmit the retrieved data from the first rig computer system 508 to the first ROC computer system 102 over the network 700.

The first rig computer system 508 can then receive a second data request from the second ROC computer system 202 located at the second ROC 200 (or another ROC computer system located at the first ROC 100), which is also remote from the first drilling rig 500. Similarly to the first data request, the second data request can also be transmitted over the network 700 or another network (not shown) that connects the second ROC 200 and the first drilling rig 500. In the second data request, the second ROC computer system 202 can seek all or at least a portion of the data associated with the petroleum well.

The first rig computer system 500 can determine that a bandwidth of the network 502, which is discrete from the network 700 and which connects the multiple ROC computer systems to each other, is greater than a bandwidth of the network 700. In response to receiving the second data request, the first rig computer system 508 can transmit an identity of the first ROC computer system 102 located at the first ROC 100 to the second ROC computer system 202 located at the second ROC 200. In addition, the first rig computer system 500 can transmit a notification to the second ROC computer system 202 to request at least the portion of the data satisfying the second data request from the first ROC computer system 102.

In some implementations, a bandwidth of the network 502 can be at least two or more times greater than the bandwidth of the network 700, which can be a satellite network. For example, the network 700 can have a bit rate of the order of kilobits per second (kbps), such as, substantially 32 kbps or 64 kbps, and the network 502 can have a bit rate of substantially 256 kbps or a bit rate that is in the order of megabits per second (Mbps). Thus, the bandwidth of the network 502 can be an order of magnitude greater than the bandwidth of the network 700. Because a volume of petroleum well data is large, a time to transmit the petroleum well data over the network 700 can be significantly longer than a time to transmit the petroleum well data over the network 502. By implementing the afore-described methods, the first rig computer system 508 can re-direct requests from ROC computer systems for petroleum well data to other ROC computer systems to which the petroleum well data has been previously been transmitted. By doing so, the first rig computer system 508 can decrease a load on the network 700.

In some implementations, when the first rig computer system 508 receives data requests from other ROC computer systems—for example, the third ROC computer system 202, the fourth ROC computer system 302, and the like—for all or portions of the petroleum well data that the first rig computer system 508 has previously transmitted to the first ROC computer system 102, the first rig computer system 508 can re-direct the other ROC computer systems to the first ROC computer system 102. In this manner, the first rig computer system 508 can assign the first ROC computer system 102 as a master computer system, and can assign other ROC computer systems that subsequently request the petroleum well data as slave computer systems. The first rig computer system 508 can instruct each of the slave computer systems to request the petroleum well data from the master computer system.

Figure 2:
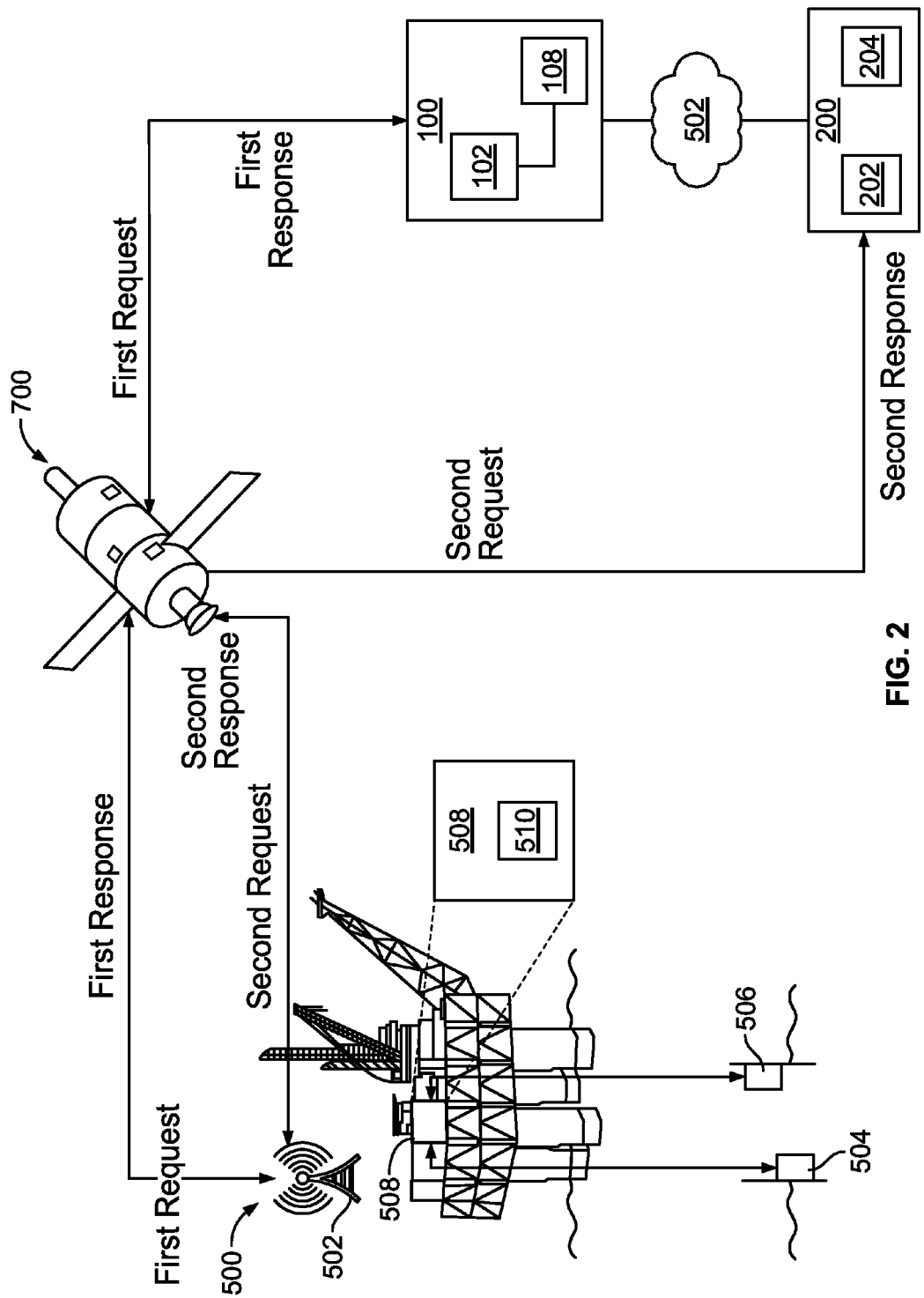
FIG. 2 illustrates real-time operation centers requesting and receiving petroleum well data from mobile drilling rigs through a satellite network.

FIG. 2 illustrates ROCs—for example, the first ROC 100 and the second ROC 200—requesting and receiving petroleum well data from the first mobile drilling rig 500 through network 700 implemented by a satellite. The first ROC 102 can transmit a first data request for data associated with the petroleum well to the satellite, which, in turn, can transmit the first data request to the first rig computer system 508, for example, to the first transceiver 502. As shown in FIG. 2, the first rig computer system 508 may be connected in real time to multiple logging tools—for example, a pressure logging tool 504, a temperature logging tool 506, and the like—which are adapted to measure the well data and to transmit the well data to the first rig computer system 508 for storage in a computer-readable database 510. It will be understood that the logging tools 504 and 506 may be located in different wells at the mobile drilling rig or both tools may simultaneously locate and gather data in the same well or the tools 504 and 506 may be disposed sequentially one after another and the data gathered sequentially.

In response to receiving the first data request, the first rig computer system 508 retrieves the well data from the database 510 and transmits the retrieved data to the satellite in a first response. The satellite then transmits the first response that includes the retrieved data to the first ROC computer system 102, which can store the data in a computer-readable database 108, and process the data to perform real-time operations.

Subsequently, the second ROC computer system 202 located at the second ROC 200 can transmit a second data request to the satellite over the network 700. In the second data request, the second ROC computer system 202 can request all or portions of data associated with the petroleum well that the first rig computer system 508 has previously transmitted to the first ROC computer system 102 as described above. The ROC computer systems located at the first ROC 100 and those located at the second ROC 200 can be connected by the network 502, which has a higher bandwidth than the network 700.

The satellite can transmit the second data request from the second ROC computer system 202 to the first rig computer system 508, for example, to the first transceiver 502. The first rig computer system 508 can determine that the petroleum well data requested in the second data request has previously been transmitted to the first ROC computer system 102. In some implementations, the first rig computer system 102 can transmit a second response to the second data request. In the second response, the first rig computer system 508 can include an identity of the first ROC computer system 102 and instructions to request the petroleum well data from the first ROC computer system 102. The transceiver 502 can transmit the second response to the satellite, which can then transmit the second response to the second ROC computer system 202. Upon receiving the second response, the second ROC computer system 202 can execute the instructions to identify the first ROC computer system 102 and to transmit a request for the petroleum well data to the first ROC computer system 102.

In a default implementation, the first rig computer system 102 can re-direct the second ROC computer system 202 to the first ROC computer system 102, as described above, regardless of the bandwidths of the network 502 and the network 700. In some implementations, a ROC computer system can be configured to include data describing the network 502—for example, the bandwidth of the network 502—in the request for the petroleum well data. In such implementations, when the first rig computer system 102 receives the request from a ROC computer system, the first rig computer system 102 can compare a bandwidth of the network 700 with that of the network 502 based on the data describing the network 502 included in the request. If the first rig computer system 502 determines that the bandwidth of the network 502 is greater than the bandwidth of the network 700, and that the requested petroleum well data has previously been transmitted to another ROC computer system, then the first rig computer system 508 can generate a response as described above.

In some implementations, the first rig computer system 508 can have previously transmitted only a portion of the petroleum well data requested by the second ROC computer system 202 to the first ROC computer system 102. In such implementations, the first rig computer system 508 can re-direct the second ROC computer system 202 to the first ROC computer system 102 for the portion of the petroleum well data requested by the second ROC computer system 202 and transmit a remainder of the well data requested by the second ROC computer system 202 over the network 700.

In some implementations, the first rig computer system 508 can receive a new request for new data associated with the petroleum well from the fourth ROC computer system 302. The new request can be for petroleum well data that is different from the petroleum well data that the first rig computer system 508 has previously transmitted to the first ROC computer system 102. In response to receiving the new request for the new data, the first rig computer system 508 can transmit the new data to the fourth ROC computer system 302. Subsequently, the first rig computer system 508 can receive another request for the new data from the second ROC computer system 202. In response, the first rig computer system 508 can provide, to the second ROC computer system 202, an identity of the fourth ROC computer system 302 and instructions to request the new data associated with the petroleum well from the fourth ROC computer system 302. The second ROC computer system 202 can execute the instructions, as described above, to obtain the new data.

In some implementations, the first rig computer system 508 can have previously transmitted a first portion of the petroleum well data requested by the second ROC computer system 202 to the first ROC computer system 102. In addition, the first rig computer system 508 can have previously transmitted a second portion of the petroleum well data requested by the second ROC computer system 202 to the third ROC computer system 204. In such implementations, the first rig computer system 508 can re-direct the second ROC computer system 202 to the first ROC computer system 102 and to the third ROC computer system 204, respectively, with respective instructions to request the first portion and the second portion, respectively, of the previously transmitted petroleum well data.

Figure 3:
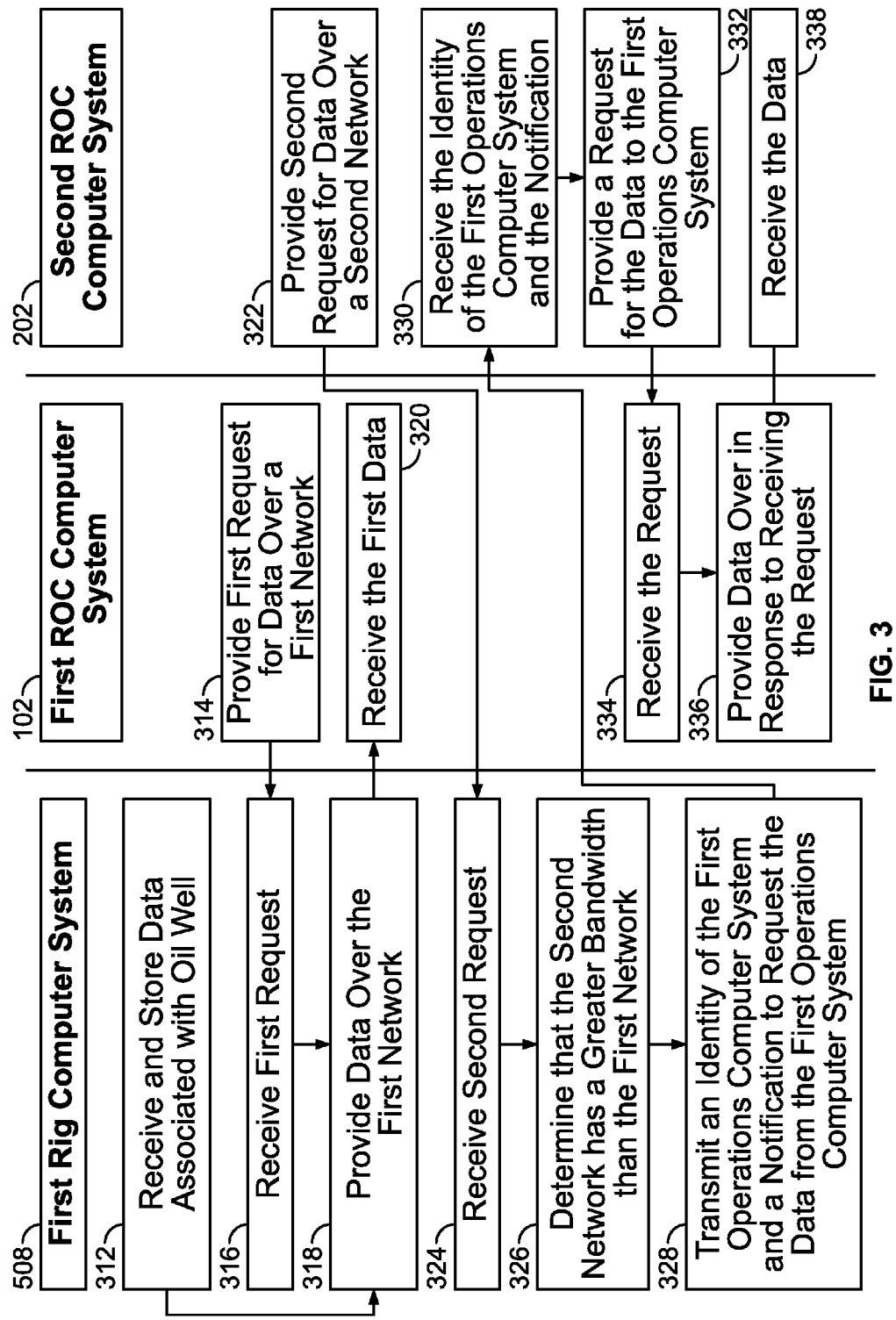
FIG. 3 illustrates operations implemented by computer systems located at mobile drilling rigs and at real-time operations centers.

FIG. 3 illustrates operations implemented by computer systems located at mobile drilling rigs and at real-time operations centers. In some implementations, the first rig computer system 508 receives and stores data associated with a petroleum well at 312. At 314, the first ROC computer system 102 provides a first request for data associated with the petroleum well over the network 700. At 316, the first rig computer system 508 receives the first request. At 318, the first rig computer system 308 retrieves the stored data associated with the petroleum well, and provides the data to the first ROC computer system 102 over the network 700. A size of the request for the petroleum well data can be smaller than a size of the petroleum well data; a burden on the network 700 to receive and transmit the request can be significantly smaller than a burden on the network 700 to transmit the petroleum well data. At 320, the first ROC computer system 102 receives the petroleum well data over the network 700, and performs operations, for example, real-time operations using the data.

At 322, the second ROC computer system 202 provides a second request for data associated with the petroleum well over the network 700. At 324, the first rig computer system 508 receives the second request from the second ROC computer system 202 over the network 700. At 326, the first rig computer system 508 determines that the network 502 that connects the first ROC computer system 102 and the second ROC computer system 202 has a greater bandwidth than the network 700. For example, the bandwidth of the network 502 can have previously been stored in the computer-readable database 510. Alternatively, each ROC computer system that transmits a request for petroleum well data to the first rig computer system 508 can include a bandwidth of the network 502 in the request.

In response to determining that the network 502 has a greater bandwidth than network 700, the first rig computer system 508 can transmit an identity of the first ROC computer system 102 and a notification to request the data from the first ROC computer system 102 at 328. At 330, the second ROC computer system 202 can receive the identity of the first ROC computer system 102 and the notification. At 332, the second ROC computer system 202 can provide a request for the petroleum well data to the first ROC computer system 102. At 334, the first ROC computer system 102 can receive the request, and, at 336, provide the requested petroleum well data in response. At 336, the second ROC computer system 202 can receive the data from the first ROC computer system 102 over the network 502.

Figure 4:
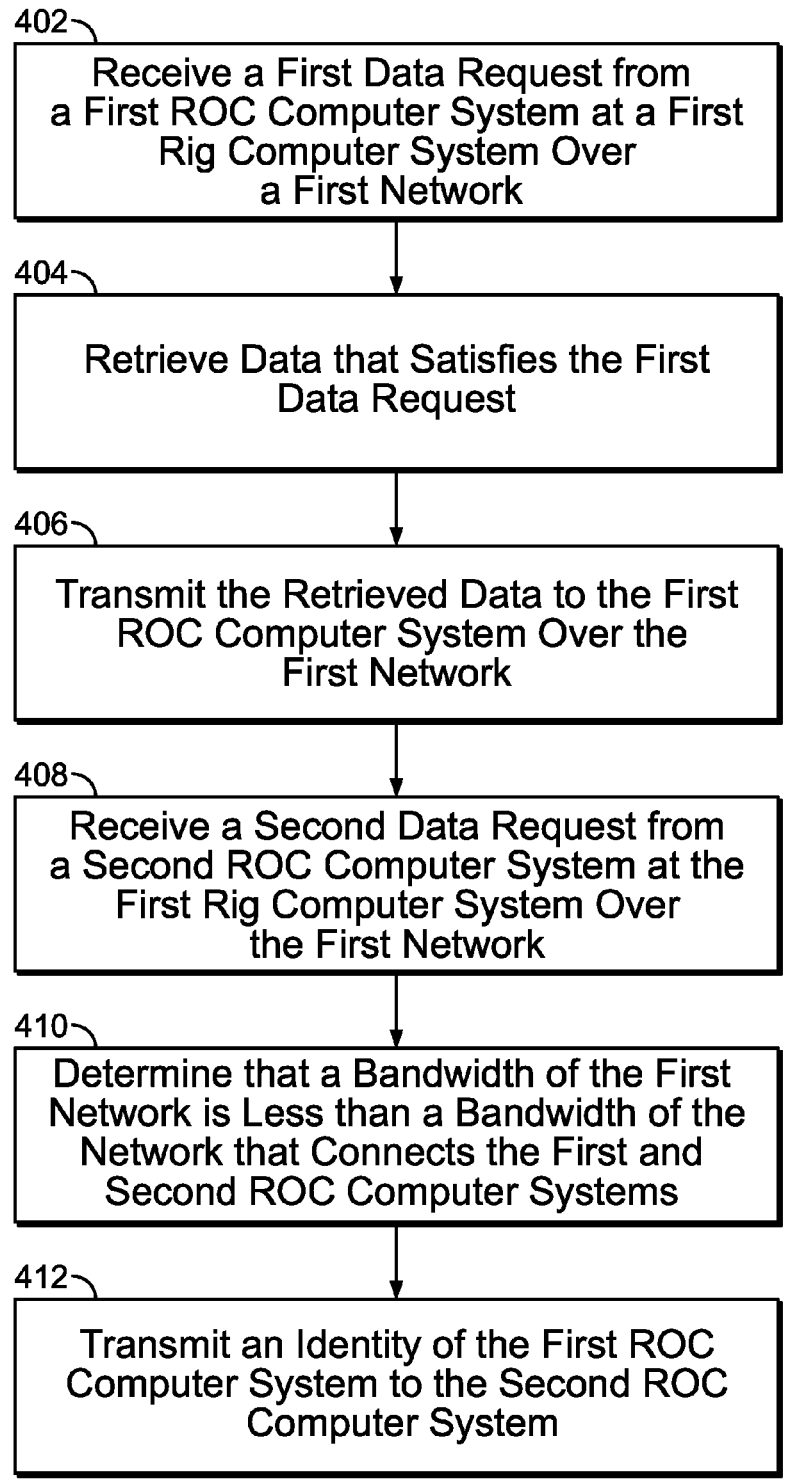
FIG. 4 is a flowchart of an example process for transmitting data associated with a petroleum well from a mobile drilling rig to operations centers.

FIG. 4 is a flowchart of an example process 400 for transmitting data associated with a petroleum well from a mobile drilling rig to operations centers. At 402, a first data request is received from a first ROC computer system at a first rig computer system over a first network. At 404, data describing the petroleum well that satisfies the first data request is retrieved. At 406, the retrieved data is transmitted to the first ROC computer system over the first network. At 408, a second data request is received from a second ROC computer system over the first network. At 410, it is determined that a bandwidth of the first network is less than a bandwidth of the network that connects the first and second ROC computer systems. At 412, an identity of the first ROC computer system is transmitted to the second ROC computer system with a notification to request the data that satisfies the second data request from the first ROC computer system.

In some implementations, when the first rig computer system 508 receives a request for petroleum well data from the second ROC computer system 202, the first rig computer system 508 can determine that portions of the requested petroleum well data have previously been transmitted to multiple ROC computer systems, for example, the first ROC computer system 102, the third ROC computer system 204, and the third ROC computer system 302. As an alternative to transmitting the identity of the each of the first, third, and fourth ROC computer systems to the second ROC computer system, the first rig computer system 508 can transmit instructions to each of the first, third, and fourth ROC computer systems to transmit the respective portion of the petroleum well data to the second ROC computer system 202 over the network 700. For example, to each ROC computer system, the first rig computer system 508 can transmit an identity of the second ROC computer system 202 and an identifier representing the portion of the petroleum well data. Upon receiving the identity and the identifier, each ROC computer system can transmit the respective portion of the petroleum well data to the second ROC computer system 202 over the network 502. In such implementations, the second ROC computer system 202 can receive the requested petroleum well data instead of instructions re-directing the second ROC computer system 202 to another ROC computer system.

In some implementations, in response to receiving a request for petroleum well data from the first ROC computer system 102, the first rig computer system 508 can transmit all of the petroleum well data to the first ROC computer system 102, and assign the first ROC computer system 102 as a master computer system. The first rig computer system 508 can then transmit an instruction to all ROC computer systems that are connected to the first rig computer system 508 to query the first ROC computer system 102 for petroleum well data. In such implementations, the first rig computer system 508 can periodically transmit to the first ROC computer system 102, new petroleum well data received and stored after all of the petroleum well data has been transmitted so that the first ROC computer system 102 stores the most recent petroleum well data.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, for example, the computer-readable medium 106, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus, for example, data processing apparatus 108, on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network, for example, network 126. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus for transmitting data associated with a petroleum well from a mobile drilling rig to operations centers, the method comprising:

receiving, at a first computer system located on a mobile drilling rig, a first data request from a second computer system located at a first operations center, said first operations center located remote from the mobile drilling rig, said first data request transmitted over a first communications network that connects the first computer system and the second computer system, said first data request seeking data associated with a petroleum well that is being drilled or has been drilled by the mobile drilling rig;

in response to receiving the first data request:

retrieving, by the first computer system, data that satisfies the first data request from a computer-readable storage medium connected to the first computer system, and transmitting over the first communications network, the data from the first computer system to the second computer system;

receiving, at the first computer system, a second data request from a third computer system located at a second operations center, said second operations center located remote from the mobile drilling rig, said second data request transmitted over a second communications network that connects the first computer system and the third computer system, said second data request seeking at least a portion of the data associated with the petroleum well;

determining, by the first computer system, that a bandwidth of a third discrete communications network that connects the second computer system located at the first operations center and the third computer system located at the second operations center is greater than a bandwidth of the second communications network; and in response to receiving the second data request, transmitting an identity of the second computer system located at the first operations center to the third computer system located at the second operations center and a notification to the third computer system located at the second operations center to request at least the portion of the data satisfying the second data request from the second computer system located at the first operations center.

2. The method of claim 1, further comprising:

assigning, by the first computer system located on the mobile drilling rig, the second computer system located at the first operations center as a master computer system;

assigning, by the first computer system located on the mobile drilling rig, computer systems located at operations centers that subsequently request the data as slave computer systems; and instructing, by the first computer system located on the mobile drilling rig, each of the slave center computer systems to request the data associated with the oil well from the master computer system.

3. The method of claim 1, wherein the second communications network is a satellite network, and wherein the bandwidth of the third communications network is at least two or more times greater than the bandwidth of the satellite network.

4. The method of claim 1, wherein the bandwidth of the second communications network is substantially 32 kilobits per second, and wherein the bandwidth of the third communications network is in the order of megabits per second.

5. The method of claim 1, wherein transmitting the identity of the second computer system located at the first operations center to the third computer system located at the second operations center comprises:

generating a response to the second data request; and including a communications network address of the second computer system located at the first operations center and the notification in the response.

6. The method of claim 1, further comprising receiving, by the first computer system, the data associated with the petroleum well from a plurality of measuring devices adapted to measure the well data and to transmit the well data to the first computer system, the well data is obtained by logging tools disposed in the petroleum well.

7. The method of claim 1 wherein the mobile rig is located in a body of water at least 50 miles remote from the first and second operations center.

8. A non-transitory computer-readable medium storing computer software instructions executable by data processing apparatus to perform operations for transmitting data associated with a petroleum well from a mobile drilling rig to operations centers, the operations comprising:

receiving, at a first computer system located on a mobile drilling rig, a data request from a second computer system located at a first operations center, said first operations center located remote from the mobile drilling rig, said data request transmitted over a satellite network that connects the first computer system and the second computer system, said data request seeking data associated with a petroleum well that is being drilled or has been drilled by the mobile drilling rig;

receiving, by the first computer system, a previous data request for the data associated with the petroleum well from the third computer system, wherein the previous data request is received before the data request from the second computer system; and in response to receiving the previous request, transmitting, by the first computer system, the data associated with the petroleum well to the third computer system over the satellite network;

determining, at the first computer system, that a bandwidth of a communications network that connects the second computer system and the third computer system is greater than a bandwidth of the satellite network; and in response to receiving the data request, providing, by the first computer system, to the second computer system:
 an identity of the third computer system, and
 instructions to request the data associated with the petroleum well from the third computer system.

9. The medium of claim 8, wherein the first computer system is located off-shore, and wherein the second computer system and the third computer system are located on-shore.

10. The medium of claim 8, wherein the network that connects the second computer system and the third computer system is a wired or a wireless network, wherein the bandwidth of the wired or the wireless network is an order of magnitude greater than the bandwidth of the satellite network.

11. The medium of claim 8, the operations further comprising:

receiving, by the first computer system, a new request for new data associated with the petroleum well that is different from the data associated with the petroleum well from a fourth computer system located at a third operations center; and in response to receiving the new request for the new data, transmitting, by the first computer system, the new data to the fourth computer system over the satellite network.

12. The medium of claim 11, the operations further comprising:

receiving, by the first computer system, another request for the new data from the second computer system; and in response to receiving the other request, providing, by the first computer system, to the second computer system:
 an identity of the fourth computer system, and
 instructions to request the new data associated with the petroleum well from the fourth computer system.

13. The medium of claim 8, the operations further comprising:

receiving, by the first computer system, a new request for the data associated with the petroleum well that has previously been transmitted to the third computer system and for additional data associated with the petroleum well that was received by the first computer system after the data associated with the petroleum well was transmitted to the third computer system, wherein the new request is received from a fourth computer system located at a third operations center over the satellite network; and in response to receiving the new request:
transmitting, by the first computer system, the additional data to the fourth computer system over the satellite network, and
providing, by the first computer system, to the fourth computer system:
the identity of the third computer system, and
the instructions to request the data associated with the petroleum well from the third computer system.

14. A system comprising:
one or more data processing apparatus; and
a computer-readable medium storing computer software instructions executable by the data processing apparatus to perform operations for transmitting data associated with a petroleum well from a mobile drilling rig to operations centers, the operations comprising:
receiving, at a first computer system located on a mobile oil rig, a request for data associated with a petroleum well from a second computer system located at a first operations center over a first communications network that connects the first computer system and the second computer system;
in response to receiving the request, transmitting, at the first computer system, the data associated with the petroleum well to the second computer system over the first network;
identifying, at the first computer system, one or more third computer systems located at one or more corresponding second operations centers, wherein each third computer system is connected to the second computer system through a communications network that has a greater bandwidth than the first communications network;
providing, at the first computer system, an identity of the second computer system to each of the one or more third computer systems; and
providing, at the first computer system, a notification to each of the one or more third computer systems to transmit a request for the data associated with the oil well to the second computer system.

15. The system of claim 14, wherein a bandwidth of the communications network that connects a third computer system to the first computer system is at least two or more times greater than a bandwidth of the first communications network.

16. The system of claim 14, wherein a bandwidth of the communications network that connects a third computer system to the first computer system is at least an order of magnitude greater than a bandwidth of the first communications network.

17. The system of claim 16, wherein the bandwidth of the first communications network is 64 kilobits per second and the bandwidth of the communications network that connects the third computer system to the first computer system is 256 kilobits per second.

18. The system of claim 14, wherein a bandwidth of the communications network that connects a third computer system to the first computer system is in the order of megabits per second, and wherein a bandwidth of the first communications network is in the order of kilobits per second.

19. The system of claim 18, wherein the bandwidth of the first communications network is 64 kilobits per second.

* * * * *